UNITED STATES PATENT OFFICE

CARL KIRCHER AND HANS ACKER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF CYANAMIDES OF THE ALKALINE EARTH METALS

No Drawing. Application filed January 14, 1931, Serial No. 508,803, and in Germany February 11, 1930.

The present invention relates to the production of cyanamides of the alkaline earth metals.

It has already been proposed to prepare cyanamides of the alkaline earth metals, which term is herein used to include magnesium, by the action of ammonia on the carbonates of these metals. The conversion proceeds very slowly, however, and requires a large excess of ammonia even when the optimum temperature of about 750° centigrade is employed. Under these conditions there is a considerable waste of ammonia by reason of decomposition. The speed of reaction may be increased considerably by mixing with the ammonia gases which are capable of forming hydrocyanic acid therewith, as for example carbon monoxide. The most favourable temperature is also about 750° centigrade in this case, however, so that again the decomposition of ammonia may readily take place. Furthermore, the working up of the gas mixture leaving the reaction chamber (which, after the absorption of ammonia, carbon dioxide and hydrocyanic acid consists of carbon monoxide, nitrogen and hydrogen) especially for the recovery of carbon monoxide is attended by considerable difficulty. Instead of a gas mixture which is capable of forming hydrocyanic acid, hydrocyanic acid itself may be employed. In this case, even at 420° centigrade, some cyanamide as well as considerable amounts of cyanide are formed. If cyanamide free from cyanide is to be obtained, temperatures of at least 600° centigrade are necessary, apart from the said difficulty of separating the carbon monoxide in the waste gases from hydrogen.

We have now found that the cyanamides of the alkaline earth metals are obtained from the oxides or carbonates of these metals, at considerably lower temperatures, which may be as low as about 300° centigrade when treating calcium oxide, and that the cyanamides are obtained free from cyanides at temperatures of for example about 400° centigrade by employing cyanogen gas or gas mixtures containing the same instead of the aforesaid reaction agents. This reaction proceeds according to the following equations in which Me represents the alkaline earth metal (including magnesium):

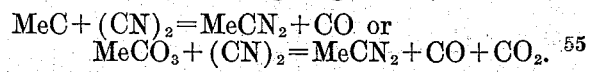

$$MeC + (CN)_2 = MeCN_2 + CO \text{ or}$$
$$MeCO_3 + (CN)_2 = MeCN_2 + CO + CO_2.$$

The temperatures used vary to some extent with the oxide or carbonate treated; as a rule, they should be at least about 300° centigrade for calcium oxide, at least about 400° centigrade for calcium carbonate or magnesium oxide, and at least about 500° centigrade for magnesium carbonate. Generally speaking, it is advisable not to exceed temperatures of from about 600° to 700° centigrade owing to the increase in the aggressiveness at higher temperatures but the reaction may be carried out at higher temperatures, temperatures up to about 900° centigrade being applicable, which are advantageous in some cases as for example on working with highly diluted cyanogen gas.

When employing oxides the reaction is exothermic; it proceeds for example in the case of calcium oxide with an evolution of about 35 calories per gram-molecule, so that the supply of the heat necessary to maintain the reaction temperature offers no difficulty whatever.

Above 400° centigrade the speed of reaction increases considerably with increasing temperature so that for example when employing calcium oxide at 600° centigrade the whole of the gas is converted even when comparatively very high speeds of flow of the cyanogen gas as for example a speed of 60 centimetres per second, are employed.

A special advantage of the process according to the present invention contrasted with those hereinbefore described consists in the fact that the waste gas consists only of carbon monoxide.

The initial materials may be from any source, either natural or artificial, limestone, dolomite, magnesite, witherite or the oxides obtained from these substances may be mentioned by way of example. It is preferable to employ the materials in a granular form since they may then be readily introduced and withdrawn from the reaction chamber and the process may be readily rendered continuous.

The following examples will further illustrate the nature of this invention but the invention is not restricted to these examples. The parts are by weight.

*Example 1*

20 parts of cyanogen gas are led during a quarter of an hour at 400° centigrade into the bottom of a vertical reaction vessel containing about 30 parts of quicklime. 88 per cent of the cyanogen gas employed are combined with the quicklime. The product obtained (about 47 parts) contains 20.1 per cent of nitrogen in the form of cyanamide and is free from cyanide.

*Example 2*

If 22.5 parts of cyanogen gas be led during three quarters of an hour at 600° centigrade into about 27 parts of quicklime, the whole of the cyanogen gas is absorbed by the quicklime and the resulting product (about 35 parts) contains 32.8 per cent of cyanamide nitrogen, that is about 94 per cent of calcium cyanamide, and 6 per cent of calcium oxide. The gas leaving the reaction chamber consists of pure carbon monoxide.

*Example 3*

About 72 parts of granular carbonate of lime, obtained as a by-product in the conversion of gypsum with ammonia and carbon dioxide, are treated for an hour at 400° centigrade with 25 parts of cyanogen gas. 28 per cent of the cyanogen gas employed are absorbed by the lime with the formation of about 69 parts of a product containing 5.6 per cent of cyanamide nitrogen, that is 16 per cent of calcium cyanamide. The remainder of the product consists of unaltered calcium carbonate.

*Example 4*

47 parts of cyanogen gas are led in the course of an hour through a reaction vessel charged with about 109 parts of magnesium oxide (prepared from magnesite) and heated to 500° centigrade. A product is obtained (about 120 parts) which contains 11.2 per cent of cyanamide nitrogen, that is 25.7 per cent of magnesium cyanamide. The remainder of the reaction product consists of magnesium oxide. 53 per cent of the cyanogen gas employed takes part in the reaction.

*Example 5*

If 52 parts of cyanogen gas be led upwards in the course of an hour at 700° centigrade through 150 parts of magnesium oxide (prepared from magnesite) 97 per cent of the cyanogen gas employed enter into reaction. Two layers are obtained which have been converted to different extents. The layer first coming into contact with the cyanogen gas, namely 95 parts, contains 27.0 per cent of cyanamide nitrogen, that is about 62 per cent of magnesium cyanamide, the second layer, namely 35 parts, containing 3.7 per cent of cyanamide nitrogen. The remainder of the reaction products consists of magnesium oxide.

What we claim is:

1. The process of producing alkaline earth metal cyanamides which comprises reacting with cyanogen gas at between about 300° and 900° centigrade on a substance selected from the group consisting of the oxides and carbonates of the alkaline earth metals.

2. The process of producing alkaline earth metal cyanamides which comprises reacting with cyanogen gas at between about 350° and 600° centigrade on a substance selected from the group consisting of the oxides and carbonates of the alkaline earth metals.

3. The process of producing calcium cyanamide which comprises reacting with cyanogen gas at between about 350° and 600° centigrade on calcium oxide.

4. The process of producing calcium cyanamide which comprises reacting with cyanogen gas at between about 400° and 600° centigrade on calcium carbonate.

In testimony whereof we have hereunto set our hands.

CARL KIRCHER.
HANS ACKER.